United States Patent
Trivero

[15] 3,658,146
[45] Apr. 25, 1972

[54] TRACK VEHICLE SUITABLE TO BE USED ON SLOPING LANDS, THE TRIMMING MOVEMENTS OF WHICH ARE CONTROLLED BY AN OLEODYNAMIC DEVICE

[72] Inventor: Mario Trivero, Via Cemelli 8, Alessandria, Italy

[22] Filed: Feb. 4, 1970

[21] Appl. No.: 8,586

[30] Foreign Application Priority Data

Feb. 8, 1969 Italy ..................................6789 A/69
Dec. 18, 1969 Italy ..................................7526 A/69

[52] U.S. Cl. ..............................................180/9.52, 180/41
[51] Int. Cl. ....................................B62d 55/00, B62d 55/08
[58] Field of Search ..................................180/9.52, 9.54, 41

[56] References Cited

UNITED STATES PATENTS

| | | | |
|---|---|---|---|
| 2,851,116 | 9/1958 | Collins | 180/9.52 X |
| 2,693,162 | 11/1954 | Poche | 180/9.52 X |
| 2,694,581 | 11/1954 | Helmle | 180/9.52 |
| 2,756,065 | 7/1956 | Schick | 180/9.52 |
| 2,778,131 | 1/1957 | Herr | 180/41 X |

FOREIGN PATENTS OR APPLICATIONS

| | | | |
|---|---|---|---|
| 1,213,268 | 10/1959 | France | 180/9.52 |
| 1,339,405 | 8/1963 | France | 180/41 |

*Primary Examiner*—Richard J. Johnson
*Attorney*—Nolte and Nolte

[57] ABSTRACT

An improved track vehicle suitable to be used on sloping lands of the type comprising on each side a rear toothed drive wheel, a front idle wheel working as a track tightener which is suitably pushed forward elastically and is supported by a side member on the underside of which are mounted a suitable number of idlers. Said side member is rigidly connected to a stiff shaped frame which is supported by the vehicle chassis by means of at least two rockers linked at one end to the vehicle chassis and at the other end to said shaped frame. Suitable driving means automatically or manually controlled by the vehicle driver are provided for displacing said side member vertically with respect to the vehicle chassis in order to compensate the level differences in the ground.

16 Claims, 4 Drawing Figures

MARIO TRIVERO
INVENTOR
BY NOLTE + NOLTE
ATTORNEY

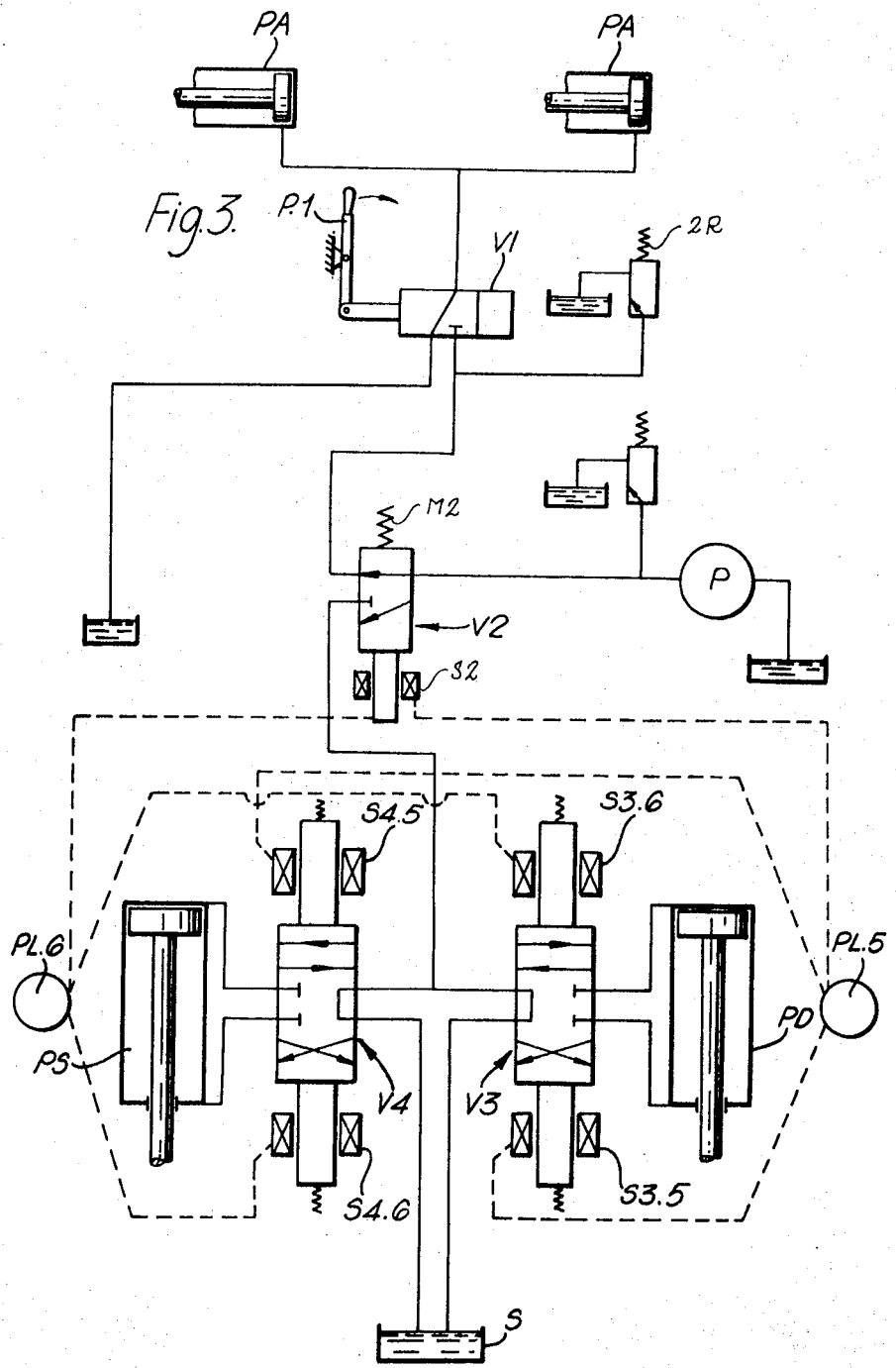

TRACK VEHICLE SUITABLE TO BE USED ON SLOPING LANDS, THE TRIMMING MOVEMENTS OF WHICH ARE CONTROLLED BY AN OLEODYNAMIC DEVICE

BACKGROUND OF INVENTION

The present invention consists of improvements in any type of track vehicles, independently of the size and power thereof, the length of the track catenary and the size of the shoes fastened to same, so as to render said vehicle suitable to be used on sloping lands. According to the present invention the track catenary is displaced to such a height as to assure the horizontal positioning of the vehicle independently of the ground sloping and/or the depth of the furrow within which the track moves.

The vehicles for agricultural works are subject to be driven on not-levelled and more or less sloping lands, and said work conditions, particularly when the vehicle moves transversally on a sloping land, may make same overturn with possible dangers and damages for the drivers.

The vehicle overturning is possible during operation on level lands too, as during plowing operations the vehicle wheels or track on the side where plowing is performed move within the furrow formed in the ground.

The deeper the plowing and thus the furrow are, the greater is the vehicle sloping and therefore the danger of overturning.

Sloping lands involve worse conditions and greater danger, considering that the inconvenience of slipping is added to that of overturning, as when the vehicle takes the same sloping as the ground it works on, slipping may not be avoided, and further the engine may not exploit its full power as the vehicle cannot keep any longer its adherence on the ground.

The conventional track vehicles transmit the motion to a chain coupled to a corresponding track by means of toothed wheels arranged on the axle shafts of the differential gear; the toothed wheels, by engaging the catenary link, transmits the motion to the track.

The track on one side surrounds about half of a rear toothed drive wheel, and on the other side about half of a front toothed idle wheel acting as a track-tightener.

Such a track-tightening idle wheel is arranged on a side member and by means of an adjustable spring it keeps always tight the track catenary, while on the underside of said side member several grooved idle rollers are arranged for supporting and guiding the lower portion of said track.

Said side member is usually pivoted, in a place opposite to said track-tightening front wheel and close to the rear toothed drive wheel, on a cross bar acting as a pivot and fastened to the vehicle. The side member so supported in a single point allows a good absorption of the shocks the front portion of the track is subject to, and an easy fitting thereof to the ground.

SUMMARY OF INVENTION

The present invention by removing any danger of sliding and overturning, allows a track vehicle to move on lands even with an either transversal or longitudinal remarkable slope, and further to move on uneven lands, keeping a good stability and to avail itself of the full power of its engine.

Object of the present invention is further to provide a simple and efficient hydraulic control.

The improved track vehicle suitable to be used on sloping lands, of the type comprising on each side a rear toothed drive wheel and a front idle wheel acting as a track-tightener, which is suitably pushed forward elastically and is supported by a side member on which are further arranged a suitable number of idle rollers, is characterized in that said side member is rigidly connected to a rigid shaped frame which is supported by the vehicle chassis by means of at least two rockers linked at one end to the vehicle chassis and at the other end to said shaped frame; suitable driving means automatically or manually controlled by the driver being provided to displace vertically with respect to said vehicle chassis such a side member so as to compensate the roughness of the ground.

According to a preferred embodiment of the invention, said shaped frame comprises a first substantially vertical front upright which is rigidly connected to said side member, a second rear upright substantially vertical or maybe inclined at its rear, and an upper cross-bar connecting the ends of said uprights. Said shaped frame is supported by the vehicle chassis by means of three rockers parallel to each other and having their free ends, with respect to said chassis, directed to the same direction; said three rockers being connected to said shaped frame correspondingly to the upper end of the first upright, to the upper end of the second upright and substantially to the base of said second upright.

According to the invention, at least one of said three rockers may be actuated about its fulcrum arranged on the vehicle chassis, by means of a preferably double-way hydraulic piston.

Such an hydraulic piston possibly actuates the two upper rockers through a suitable set of tie rods connecting directly the end of the piston rod to two lever arms rigidly connected to said two upper rockers.

The rocker linked to the upper end of the front upright of said shaped frame, is provided with a bell crank arm projecting at the top above its linkage point to the vehicle chassis, on said arm being arranged the end of a double-way hydraulic cylinder which at its end is linked to the vehicle chassis.

According to the invention, when the side member is in its normal position corresponding to the vehicle position on level ground, said rockers are inclined upwardly with respect to the horizontal at an angle between 0° and 45° and preferably between 5° and 35°.

When the side member is in its fully lowered position corresponding to the maximum sloping which the displacement of said member may balance in the vehicle position, said rockers are inclined downwardly with respect to the horizontal at an angle between 0° and 45° and preferably between 5° and 35°.

In a preferred particular embodiment of the invention, the correction of the vehicle transversal position is performed by lowering the side member arranged downstream with respect to the ground sloping, and keeping steady the other side member.

According to a modification, the correction of the vehicle position is performed by displacing vertically for the same distance, but in opposite directions, the side members of the vehicle.

According to the invention, each shaped frame has a double-wall construction, so that each side member is supported on two sides and the upper section of each track moves between the two walls of the corresponding shaped frame, and said rockers too are double-walled with a substantially fork shape.

In the improved track vehicle, the oleodynamic device actuating the pistons which adjust the vehicle position, is characterized in that it comprises a pump sucking oil from a tank; an electrovalve with two positions of which one is operative and the other non-operative, means for feeding oil under pressure from said two-positions electrovalve to two three-position symmetric servovalves for actuating said two double-action pistons correspondingly to the operative position of said first electrovalve; means controlling said two symmetric servovalves in opposite operative position, so that when one of the two double-action pistons is made to advance, the possible retraction of the other double-action piston is caused too.

Each of said symmetric servovalves includes a central non-operative position correspondingly to which the associated double-action piston is prevented from displacing, while the oil under pressure is deflected, towards the tank.

The control means for said two symmetric servovalves consist of two push bottons to be actuated reciprocatingly, by means of which are controlled: the excitation of the solenoid moving said first two-position electrovalve to its operative position; the excitation of a solenoid for the piston advancing which causes the first of said two symmetric servovalves to move to its operative position, and thus allows the associated piston to be advanced; the excitation of a solenoid for the other piston retraction which causes the other symmetric servovalve to move to its operative position and thus allows the other piston to retract.

The feeding of pressure oil to the means actuating the usual operative pistons of the tractor is allowed correspondingly to the non-operative position of said first electrovalve.

According to a modification of the invention, wherein the vehicle trimming is performed through simple-action pistons, the device controlling the pistons comprises an electrovalve with three positions of which the central one is non-operative and the two side ones are operative for the trimming right piston and the trimming left piston respectively, wherein: in the central position of said electrovalve pressure fluid is fed to a hand distributor for actuating the usual pistons of the tractor; in the first operative position pressure fluid is fed to the trimming right piston and at the same time the tank is put in communication with the trimming left piston and viceversa for the second operative position of said electrovalve.

BRIEF DESCRIPTION OF THE DRAWINGS

The accompanying drawings show embodiments selected by way of example only of the invention;

FIG. 3 shows the electro-hydraulic diagram of the device controlling the pistons which adjust the vehicle trimming and FIG. 4 shows a simplified modification of said piston controlling device.

DESCRIPTION OF THE PREFERRED EMBODIMENTS

Figure 1:
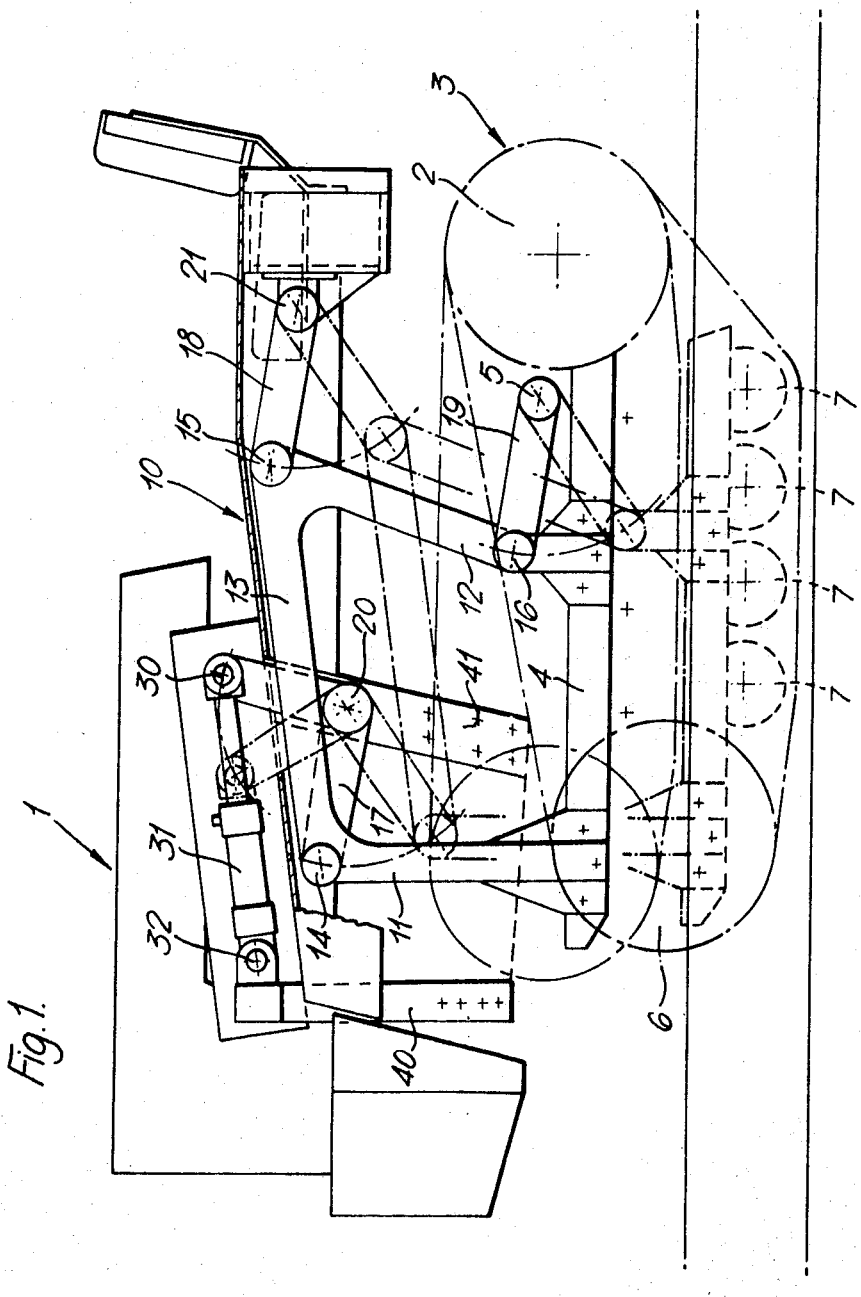
FIG. 1 shows diagrammatically the side outline of a track vehicle according to the invention where by a continuous line is shown the support unit for the left track in its operative position on level ground, while by a broken line is shown the position of maximum lowering of said unit, to the latter position corresponding a downward sloping ground on the left side of the vehicle, which in this case is an agricultural tractor.
Figure 2:
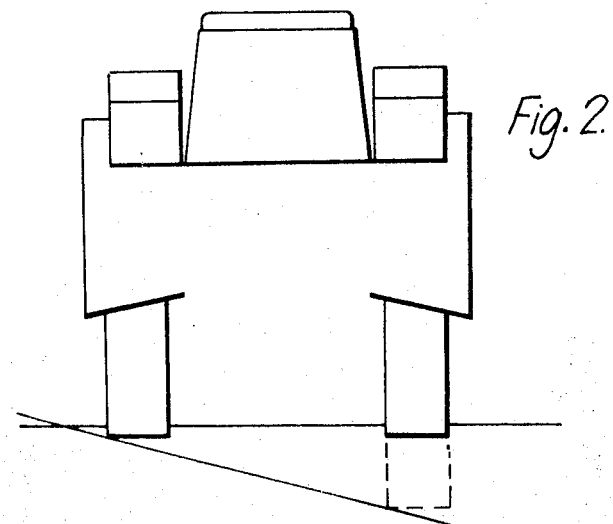
FIG. 2 shows a diagrammatic front view of the same track vehicle.

With reference to FIGS. 1 and 2, numeral 1 is a track vehicle, heretofore called tractor, supported on each side, through a suitable chassis not shown in detail, by a toothed drive wheel 2 suitable to pull a chain of known type couples in usual way to the inner face of a track 3 diagrammatically shown by a dotted line. Numeral 4 is a side member which in conventional tractors is capable only of small swingings about a pivot 5 rigidly connected to said chassis; 6 is an idle wheel freely moving on side member 4 and acting as a tightener for track 3; said idle wheel operates as a conventional tightener by means of an elastic member (not shown) which rest on the side member and pushes the wheel forward against the track; 7 are track supporting rollers mounted idle on corresponding pins not shown, and supported by side member 4; the forward portion of said tractor is supported, through a cross leaf spring not shown, by the front ends of side members 4.

According to the invention, upon a suitably obtained actuation, side member 4, and idle wheel 6 and rollers 7 therewith, is capable of changing its level with respect to the tractor chassis and keeping substantially parallel to itself, when a suitable automatically responsive means or the driver by hand perceives a transversal difference of level of the ground with respect to the tractor.

In order to make possible such a movement of the side member with respect to the tractor chassis, each side member is provided with a shaped frame having a substantially quadrilateral form 10 and consisting of a first substantially vertical front upright 11, a second backward inclined rear upright 12 and a connecting upper crossbar 13. Further correspondingly to the upper ends of uprights 11 and 12 as well as correspondingly to the foot of upright 12 such an articulated frame 10 is linked through corresponding pivots 14,15 and 16 to the ends of three oscillating rockers 17,18 and 19 which at their ends are linked to and supported by the tractor chassis by means of pivots 20,21 as well as by said pivot 5. Said rockers 17,18 and 19 are parallel to each other and directed to the same direction whereby when a vertical force acts on side member 4, same moves vertically parallel to itself. The movement of vertical displacement of side member 4 is practically obtained by shaping rockers 17, connected to the upper end of front upright 11, as the arm of a bell crank having at 14 its resistance point, at 20 its fulcrum and at 30 its point of application of the driving power. Such a driving power consists in the case shown of a hydraulically working double-action piston 31 linked on one side at 30 to an arm 17' integral with rocker 17 and on the other side to the tractor chassis by means of a pin 32.

When there is a difference of level in the ground with a transversal sloping with respect to the tractor downwardly inclined on the left side thereof, by means of piston 31 is applied automatically or manually a force directed to the left, with respect to the figure, at point 30. Then rocker 17 rotates in anticlockwise direction drawing rockers 18 and 19 whereby side member 4 displaces downwards parallel to itself until compensating the level difference in the ground as shown in FIG. 2 and also in FIG. 1 by a broken line. When the tractor moves again on level ground, said member 4 will be displaced again to its level position, by means of said piston 31. From a theoretical point of view, it would be sufficient for shaped frame 10 to be supported through a single pair of rockers 17 and 19; however, the number of three shown in the figure is more advisable from the operative point of view, as it allows a higher stiffening of said shaped frame. Further, when only two rockers 17 and 19 should be provided, a suitable crossbar of said shaped frame should connect directly the hanging points of said frame, covering the central portion of the tractor and making poorly available the mechanisms arranged just above the upper section of the track.

According to the present embodiment of the invention, said shaped frame is double-walled, so that it may surround on two sides the upper section of the track; particularly said rockers are made in form of a fork.

Numerals 40 and 41 denote two portions of the tractor chassis to which are connected on one side the joint pivot 32 of cylinder 31 and on the other side the joint pivot 20 of rocker 17.

Also rocker 18 may be possibly provided with a bell crank arm similar to the one of rocker 17. The ends of said two arms may be made integral for instance by means of a tie rod, so that the piston motion is transmitted directly and simultaneously to said two rockers 17,18.

It is important to notice that wheel 2 is not subject to any displacement with respect to the vehicle chassis when side member 4 is lowered or lifted.

Further, the clasping angle between the track and the two wheels 2 and 6 keeps wide with any position of side member 4.

Finally, it is to be appreciated that the double-wall construction of shaped frame 10 prevents side member 4 from any transversal rocking movement with respect to the vehicle chassis.

With particular reference to FIG. 3, P is the pump every agricultural tractor is provided with for lifting the relevant work implements by means of one or two simple action pistons denoted in the figure by PA In said tractor, according to the invention, pump P is also used for lifting the right track of alternatively the left track by means of double action pistons PS and PD respectively, said pistons being shown in the figure in their retracted position, i.e. corresponding to a horizontal position of both the ground and the vehicle. For said hydraulic pistons PS and PD the double action construction was selected as the return of the piston into its cylinder when the land sloping reverses must be as quick as possible. S denotes the tank of pump P; V1 is a manual distributor fed by pump P through electrovalve V2; V1 receives the oil from electrovalve V2 and when pistons PA are to be fed through a driver's manual operation, said distributor is opened through a lever; when on the contrary pistons PA do not need oil, the latter through the maximum pressure valve 2R goes back to tank S. V2 is a second electrovalve constantly pushed by spring M2 to a first operative position wherein pressure oil is fed to distributor V1, while when solenoid S2 is excited through manual push-bottons PL5 or PL6, electrovalve V2 is moved to a second operative position wherein are intercepted both the feeding and the discharge of pistons PA which remain locked in their present position. In such a second operative position, the electrovalve V2 feeds pressure oil to servovalves V3 and V4. Each of said servovalves, e.g. servovalve V3, has three positions: a non-operative central position correspondingly to which the pressure oil fed by electrovalve V2 is conveyed back to tank S; a first operative position correspondingly to which, with solenoid S3.6 excited through actuation of push-button PL6, V3 is pushed to the left so as to make piston PD re-enter in case same has advanced; and a second operative position, correspondingly to which, with solenoid S3.5 excited through actuation of push-buttons PL5, V3 is pushed to the right so as to make piston PD advance. Valve V4 operates correspondingly.

Push-buttons PL5 and PL6 serve, as already said, on one side to excite solenoid S2 of electrovalve V2 and on the other side to control for push-button PL5 solenoids S3.5, and for push-button PL6 solenoids S3.6 and S4.6 respectively.

In this way, through push-button PL5, on one side both the discharge and the feeding of pistons PA are intercepted, and at the same time on the other side the retraction of piston PS and advancing of piston PD are controlled. Actually, by suitably proportioning the pump power and above all by considering that the tractor weight tends to make the piston to re-enter it is possible to obtain the retraction of piston PS to be quicker and even to precede the advancing of piston PD. Push button PL6 works in a symmetric way. It is to be appreciated that the claimed device fully exploits the oleodynamic system usually provided on any tractor, that is pump P, tank S which however should be suitably enlarged, and pistons PA.

Obviously, the electrovalves and servovalves shown in the drawing may be embodied in a different way, though keeping unchanged their operative principle.

In normal conditions, that is when the tractor moves on horizontal land, pistons PS and PD are in their retracted position shown in the figure; distributor V1 is fed by P and when push-button PL1 is actuated the two pistons PA may be lifted to the required position together with the implement they carry. When the land is inclined, for instance on the right, by actuating push-button PL5 first both the discharge and the feeding of pistons PA are intercepted and thus the feeding of distributor V1 is stopped, at the same time solenoids S3.5 and S4.5 are excited and piston PD is made to advance, while piston PS remains in its retracted position.

If now the land sloping reverses, by releasing push button PL5 and actuating push-button PL6, piston PD is made to re-enter and thus piston PS to advance, and that though the controls of said two pistons are simultaneous for the said reason. In fact, as above said, by suitably proportioning the pump delivery it is obtained practically first piston PD re-entering and then piston PS advancing; therefore, by releasing push-button PL6 as soon as piston PD has re-entered, the tractor may be easily brought again to its normal position when the land sloping on the right changes to a level land.

Figure 4:
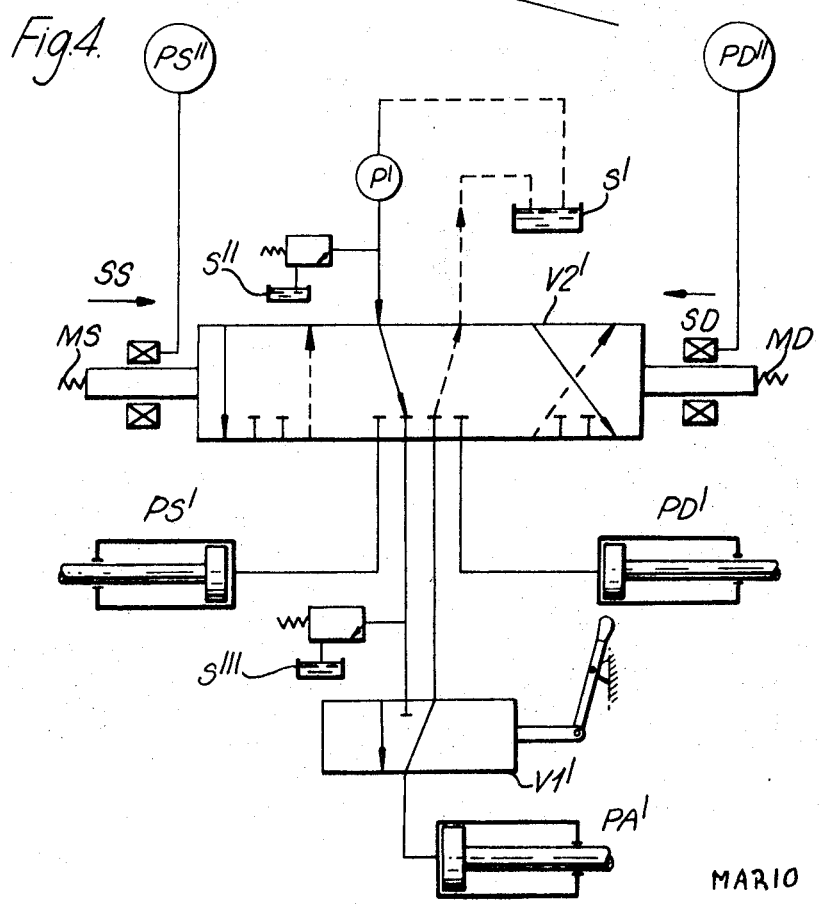

With particular reference to FIG. 4, P' and S' are the pump and the tank respectively, which are also denoted by and S'' and S'''. V2' is a three position electrovalve kept in its non-operative central position shown in the figure by springs MD and MS and pushed to its two operative side positions by solenoids SS and SD fed through push buttons PS'' and PD''. PS' and PD' are single-action pistons for actuating the levelling device of the tractor. V1' is a manually controlled distributor with two positions, in the first of which, when electrovalve V2' is in its non-operative position, pressure oil feeding to pistons PA' is controlled, or the discharge of PA' is allowed by putting them in communication with S'.

Obviously the use of simple-action pistons makes the whole device less expensive, even though operative quickness thereof is slightly decreased.

What is claimed is:

1. An endless track vehicle usable on sloping and level land comprising a chassis, on each side a rear toothed drive wheel mounted in fixed relationship upon the chassis, a resiliently mounted front idler wheel maintaining track tension, said wheel being mounted on a side member on the underside of which are mounted a suitable number of idle rollers, wherein said side member is fixedly connected to a rigid frame which is supported by the vehicle chassis independently of the drive wheel mounting by means of at least two rockers linked at one end to the vehicle chassis and at the other end to said frame; and means for displacing said side member vertically with respect to the vehicle chassis and the drive wheel mounting in order to compensate for level differences in the ground by assuming a vertically displaced position in parallel relationship to the corresponding side member of the other track.

2. An improved track vehicle as claimed in claim 1, wherein each frame has a double-wall construction so that each side member is supported on two sides, and the upper section of each track moves between the two walls of the corresponding frame, said rockers having a double-wall contruction and being substantially fork shaped.

3. An endless track vehicle usable on sloping and level land comprising a chassis, on each side a rear toothed drive wheel mounted upon the chassis, a resiliently mounted front idler wheel maintaining track tension said wheel being mounted on a side member on the underside of which are mounted a suitable number of idle rollers, wherein said side member is fixedly connected to a rigid frame which is supported by the vehicle chassis by means of at least two rockers linked at one end to the vehicle chassis and at the other end to said frame; and means for displacing said side member vertically with respect to the vehicle chassis in order to compensate level differences in the ground wherein said frame comprises a first, substantially vertical front upright rigidly connected to said side member, a second rear upright and a cross bar connecting the upper ends of said uprights, said frame being linked to the vehicle chassis by means of three rockers parallel to each other and having their free ends, with respect to said chassis, directed to the same direction; said three rockers being connected to said frame at the upper end of the first upright, at the upper end of the second upright and substantially at the base of said second upright respectively.

4. An improved track vehicle as claimed in claim 3, wherein at least one of said three rockers is rotatable about its connection to the vehicle chassis by means of an hydraulic piston; said hydraulic piston actuating the two upper rockers through tie rods connecting directly the end of the piston rod to two lever arms which are rigidly connected to said two upper rockers.

5. An improved track vehicle as claimed in claim 3, wherein the rocker linked to the upper end of the front upright of said frame is a bell crank having one limb projecting above its point of linkage to the vehicle chassis, and a double-action hydraulic cylinder connects said arm and the vehicle chassis.

6. An improved track vehicle as claimed in claim 3, wherein, with the side member in its normal position corresonding to the vehicle moving on a level ground, said rockers are inclined upwards with respect to the horizontal at an angle between 0° and 45°.

7. A vehicle as claimed in claim 6 wherein said rockers are inclined upwards with respect to the horizontal at an angle between 5° and 35°.

8. An improved track vehicle as claimed in claim 3, wherein with said side member in its fully lowered position corresponding to the maximum sloping which the displacement thereof may correct on the vehicle trimming, said rockers are inclined downwards with respect to the horizontal at an angle between 0 and 45°.

9. A vehicle as claimed in claim 8 wherein said rockers are inclined downwards with respect to the horizontal at an angle between 5° and 35°.

10. An endless track vehicle comprising a chassis, on each side a rear toothed drive wheel mounted upon the chassis, a resiliently mounted front idle wheel maintaining track tension said wheel being mounted on a side member on the underside of which are mounted a suitable number of idle rollers, wherein said side member is fixedly connected to a rigid frame which is supported by the vehicle chassis by means of at least two rockers linked at one end to the vehicle chassis and at the other end to said frame and means for displacing said side member vertically with respect to the vehicle chassis in order to compensate the level differences in the ground, wherein the means for displacing said side members comprises a pump, an oil reservoir; a two-position solenoid valve, one of said positions being non-operative and the other operative; means for feeding pressure oil from said two-position valve to two symmetric three-position servovalves for actuating two double-acting pistons corresondingly to the operative position of said first valve; control means for said two symmetric servovalves for actuating reciprocatingly said two servovalves to opposite operative positions so that the advancing of one of said two double-acting pistons and the retraction of the other double-acting piston occur together.

11. An endless track vehicle as claimed in claim 10, wherein each of said symmetric servovalves has a central non-operative position correspondingly to which the associated double action piston is prevented from displacing, while the pressure oil is deflected towards the tank.

12. An endless track vehicle as claimed in claim 10, wherein the control means of said two symmetric servovalves consist of two push-buttons, actuable alternatively, to move said first two-position solenoid valve to its operative position, to cause the displacement of a first of said two symmetric servovalves to its operative position allowing the associated piston to advance and the other piston to retract.

13. An improved track vehicle as claimed in claim 10, wherein the feeding of pressure oil to the control means of the tractor normal pistons is allowed correspondingly to the non-operative position of said first electrovalve.

14. An endless track vehicle comprising a chassis and a pair of longitudinally disposed endless tracks, each track having a toothed drive wheel mounted in fixed relationship upon and at the rear of the chassis, a resiliently mounted track tensioning idler mounted at the front of a longitudinally extending beam, a plurality of idlers mounted on the beam, a linkage connecting the beam and the chassis independently of the drive wheel mounting and being operable to displace said beams so that it assumes a vertically displaced position in parallel relationship relatively to the corresponding beam of the other of the vehicle tracks, said linkage comprising a plurality of spaced links each one of which is pivoted to the chassis and to the beam.

15. The vehicle as claimed in claim 14 wherein said beam is mounted upon a frame which is connected to the chassis through said linkage.

16. A vehicle as claimed in claim 14 wherein said means for displacing the beam comprises a double-acting piston and cylinder unit.

* * * * *